Dec. 21, 1943.   B. W. WILLINGER   2,337,362
DEVICE FOR CRIMPING FERRULES ON AIR HOSE
Filed March 9, 1942

B. W. WILLINGER
INVENTOR

ATTORNEY

Patented Dec. 21, 1943

2,337,362

UNITED STATES PATENT OFFICE 2,337,362

DEVICE FOR CRIMPING FERRULES ON AIR HOSE

Bernard W. Willinger, El Monte, Calif., assignor to Socony-Vacuum Oil Company, Incorporated, New York, N. Y., a corporation of New York Application March 9, 1942, Serial No. 434,019

1 Claim. (Cl. 81—15)

The object of the invention is to provide an inexpensive and effective device for crimping ferrules on hose adapted to convey fluids under considerable pressure, such as air hose.

Air pressure hose and the like is formed of a plurality of layers of strong cotton fabric saturated and covered with rubber or a substitute therefor. Lengths of such hose are joined to each other and to desired fittings by inserting a thin stiff metallic tube in the bore of the hose and passing a softer tube (as of brass) over the outside. This outer tube, sleeve, or ferrule is then distorted or crimped by external pressure in order to grip the hose wall firmly between the ferrule and the liner tube.

The devices in current use for producing the crimp are actuated by a lever and grip the ferrule between jaws so formed as to produce indentations extending partially around the ferrule. These devices are bulky and heavy, and the strength of the grip which they produce leaves much to be desired.

I have discovered that a much stronger grip of the ferrule on the hose may be produced by rolling it by a crimping wheel or wheels, thus producing a crimp of any desired depth around the entire circumference of the ferrule. I have also devised an apparatus of small cost, which may be held in the hand and is adapted to be carried in the tool chest of an automobile or truck, by means of which this circumferential crimp may be applied for making repairs on the road.

This apparatus and its operation are illustrated in the appended drawing, in which Fig. 1 is a longitudinal vertical section;

Figure 2:
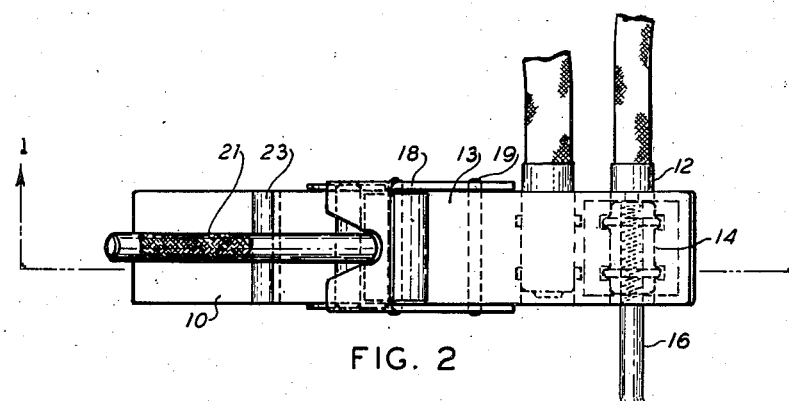
Fig. 2 is a plan view.
Figure 1:
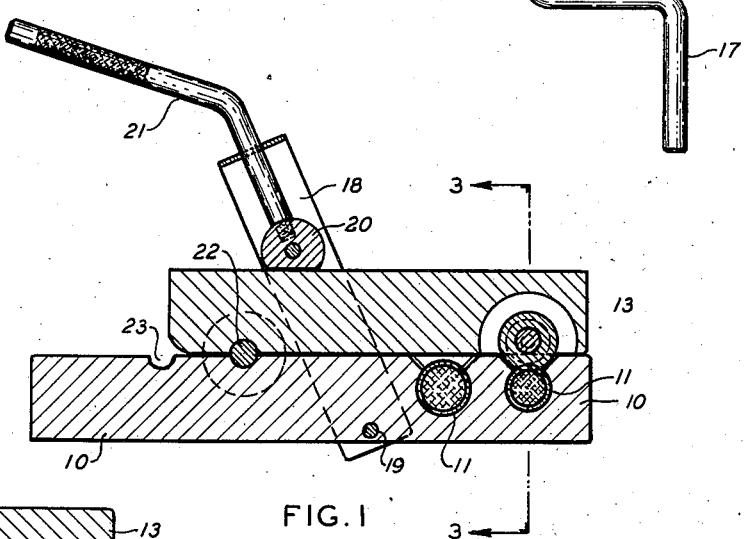
Figure 3:
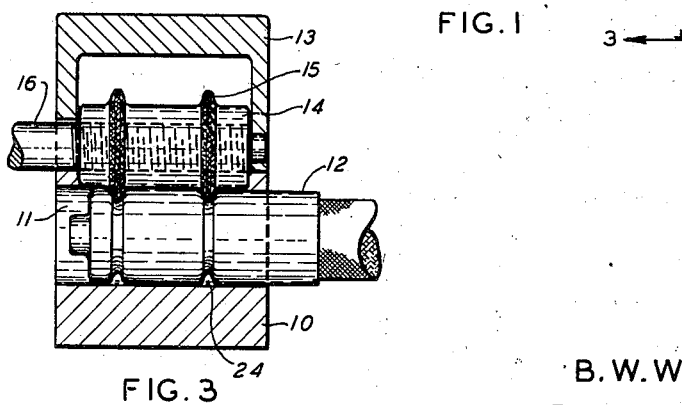
Fig. 3 is a partial cross section and elevation as on the line 3—3 of Fig. 1, on a somewhat enlarged scale.

Referring to the drawing, a rectangular metal base block 10 is provided with one or more drilled holes 11 to receive standard sizes of hose ferrules 12. A second block 13 carries a crimping wheel 14 having one or more circumferential ridges 15, these ridges having milled or roughened faces as shown in Fig. 3. The crimping wheel is attached to a shaft 16 which is rotated by a hand crank 17.

The two blocks are held together by a yoke 18 pivoted in the base block as at 19 and carrying a cam 20 actuated by a thumb lever 21. A projection 22 from the lower face of the upper block fits into a corresponding grove or grooves 23 in the base block, to hold the crimping wheel in alignment with a ferrule placed in one of the bores 11. The single wheel may thus be used to crimp a ferrule in either bore 11 by raising the yoke to the vertical position and sliding the upper block endwise on the lower to the desired position.

When the hose with a ferrule slipped over its end is placed in a bore 11 of corresponding size, the lever 21 is pressed downward gently to bring the crimping wheel into relatively light contact with the ferrule. The crank 17 is then revolved and the pressure on lever 21 being continued, the milled faces of ridges 15 cause the ferrule to revolve and produce a groove or grooves in the metal of the ferrule, these grooves being continuous around its circumference and locking the hose in the ferrule in the tightest possible manner.

I claim as my invention:

In a device for crimping hose ferrules: a bored block having a lateral bore to receive and rotatably support the end of a hose with a ferrule thereon, said bore having an open upper side, exposing the ferrule to be crimped; a superimposed upper block carrying a rotatable crimping wheel and a crank arranged to rotate said wheel, said wheel having a circumferential milled ridge projecting below the lower surface of the upper block and into the open upper side of said bore and into contact with said ferrule when said blocks are closely approached, and cam means swingingly supported by said bored block and engaging the upper surface of the upper block, whereby swinging of said cam means in one direction will progressively force said blocks toward each other while swinging the cam means in the other direction will release the upper block to permit the withdrawal of the crimping wheel from the bore.

BERNARD W. WILLINGER.